United States Patent [19]

Geyer, Jr. et al.

[11] Patent Number: 4,477,951

[45] Date of Patent: Oct. 23, 1984

[54] VISCOSE RAYON SPINNING MACHINE

[75] Inventors: Charles J. Geyer, Jr., Berwyn; Ben E. White, Wayne, both of Pa.

[73] Assignee: Fiber Associates, Inc., Berwyn, Pa.

[21] Appl. No.: 969,727

[22] Filed: Dec. 15, 1978

[51] Int. Cl.³ .......................... D02J 1/22; D06F 3/00
[52] U.S. Cl. ........................................ 28/246; 68/175; 264/188; 264/197; 425/67; 425/86
[58] Field of Search ................... 264/188, 103, 196; 425/66, 69, 71, 70, 73

[56] References Cited

U.S. PATENT DOCUMENTS

| | | | |
|---|---|---|---|
| 1,117,604 | 11/1914 | Reid | 264/196 |
| 2,139,449 | 12/1938 | Karns | 264/188 |
| 2,225,638 | 12/1940 | Jordan | 425/73 |
| 2,228,155 | 1/1941 | Serinis | 425/69 |
| 2,265,984 | 12/1941 | Allen et al. | 425/66 |
| 2,364,407 | 12/1944 | Walker | 264/38 |
| 2,410,673 | 11/1946 | Naumann | 264/188 |
| 2,413,102 | 12/1946 | Ebert et al. | 264/38 |
| 2,494,468 | 1/1950 | Borzykowski | 264/198 |
| 2,625,461 | 1/1953 | Richter et al. | 264/197 |
| 2,683,072 | 7/1954 | Clark | 264/38 |
| 2,711,559 | 6/1955 | Lynch et al. | 425/69 |
| 2,788,256 | 4/1957 | Allen | 264/197 |
| 2,852,808 | 9/1958 | Sowter et al. | 425/70 |
| 2,895,790 | 7/1959 | Brown et al. | 264/198 |
| 2,898,627 | 8/1959 | Bley et al. | 264/103 |
| 2,920,346 | 1/1960 | Jori | 425/66 |
| 2,979,767 | 4/1961 | Ivy | 264/198 |
| 3,051,986 | 9/1962 | Hoffmann | 425/70 |
| 3,094,742 | 6/1963 | Rybicki et al. | 264/188 |
| 3,341,645 | 9/1967 | Horiuchi et al. | 425/66 |
| 3,924,984 | 12/1975 | Giacobazzi | 425/73 |
| 4,045,532 | 8/1977 | Serkov et al. | 264/196 |

FOREIGN PATENT DOCUMENTS

| | | | |
|---|---|---|---|
| 1187343 | 2/1965 | Fed. Rep. of Germany | 425/70 |
| 1669376 | 9/1969 | Fed. Rep. of Germany | 264/38 |
| 407090 | 8/1944 | Italy | 425/70 |
| 789691 | 1/1958 | United Kingdom | 425/72 S |
| 925741 | 5/1963 | United Kingdom | 264/179 |
| 981896 | 1/1965 | United Kingdom | 264/38 |

Primary Examiner—Jay H. Woo
Assistant Examiner—James C. Housel
Attorney, Agent, or Firm—Austin R. Miller

[57] ABSTRACT

Apparatus for spinning viscose rayon comprising an acid bath having an enclosure arranged for substantially completely trapping and collecting any gases emanating from said bath, a plurality of fiber-forming jets disposed substantially along beneath the surface of said acid bath, means for forcing aqueous xanthated alkali cellulose in liquid form into said jets and through said jets upwardly into said bath, and take-up means located within said enclosure above said bath for taking up the resulting fibers in an upward direction within said enclosure, and thence through an enclosed secondary hot bath for the purpose of stretching the cellulose-xanthate, regenerating it to cellulose, and for trapping and collecting gases and other chemicals.

48 Claims, 8 Drawing Figures

VISCOSE RAYON SPINNING MACHINE

This is a continuation of application Ser. No. 576,126, filed May 9, 1975.

INTRODUCTION

This invention relates to a new machine and process for spinning viscose rayon staple fibers, and more particularly relates to a viscose rayon spinning machine which is capable of operation with a minimum of pollution and with maximum ecological acceptance, and which operates more efficiently and at a lower capital cost than viscose spinning machines and methods heretofore devised.

DISCUSSION OF THE PRIOR ART

In the past, viscose rayon staple spinning machines were functionally satisfactory from a cost-operational viewpoint, although important quality and operation deficiencies were present. However, with the necessity to eliminate pollution, the standard viscose rayon machine became substantially obselete as designed and operated.

Even without the pressure to provide anti-pollution measures, there were several inherent quality and operating deficiencies which could be eliminated, in order to provide a more uniform product, a lower capital investment per unit produced, and a lower operating cost.

One of the foregoing deficiencies resided in the fact that horizontal spinning was used, leading to:

(a) non-uniform drag of spin bath upon filaments as they emerged from the bath, (b) necessity for a high rate of spin bath recirculation to maintain uniformity of concentration from jet to jet, wherein recirculation amounted to approximately 10 to 20 times the flow required for neutralization of the viscose and filament formation.

Further, serious deficiencies have been experienced in practicality of complete chemical recovery because:

(a) there was no separation of reacted acid from the general bath mixture, (b) the regeneration-stretch bath design was inadequate to insure complete regeneration and elimination of $CS_2$, and (c) frequent spinning interruptions were encountered, which interruptions prevented operation of an essentially sealed gas recovery system.

In prior viscose spinning machines, there has been a great deal of discontinuity and disruption in spinning. Even when an operation had reached an equilibrium considered commercially and economically acceptable, a substantial portion of spinning positions were always out of service. This could reach up to 25% of the installed positions. Over and above scheduled production changes, ends are frequently out of service because the whole machine is down for repairs and maintenance, or because individual ends are awaiting individual repairs and maintenance (broken godets, pumps, guides, etc.), or because for purposes of viscose age control, a number (approximately 10%) of the ends are designated as "swing" to use in lowering viscose age, and further because of jet failure or poor acid distribution.

Entirely aside from lost production (or increased capital cost, since approximately 25% more ends were required to achieve a given production in practice than were required by the basic fiber specification and machine design capabilities), these frequent interruptions, demanding operator attention, led to the following:

(a) designs which put major emphasis on easy accessibility rather than chemical recovery, (b) necessarily excessive fresh air supply to protect workers working on the machine, and (c) introduction of so much air into the $CS_2$ recovery system that complete recovery for all staple types became uneconomic.

While each of the foregoing disadvantages is probably known to those conversant with rayon staple manufacture, there interrelationship has not been recognized nor have the full consequences been realized. It is not, in fact, practicable to design for full recovery of chemicals unless changes in either the viscose making or spinning machine design, or both, result in much higher spinning efficiency than that heretofore achieved commercially; that is, a substantial increase in the production between random interruptions. Or equivalently, an increase in the fraction of positions in operation at all times compared to the total number installed.

It is a principle of this invention that any viscose system and machine design that delivers substantially uninterrupted spinning will permit full chemical recovery and furthermore will reduce operating costs and capital cost per unit of realized production.

It is accordingly an object of this invention to cut capital costs and operating costs in a viscose rayon spinning machine directly. Another overall objective is to create a system which results in improved spinning performance and easier and more efficient and ecologically acceptable chemical recovery.

It is a still further object of this invention to provide a total system that spins more efficiently so that cost cutting and chemical recovery become feasible.

Other objects and advantages of this invention will further become apparent hereinafter, and in the drawings.

Figure 1:
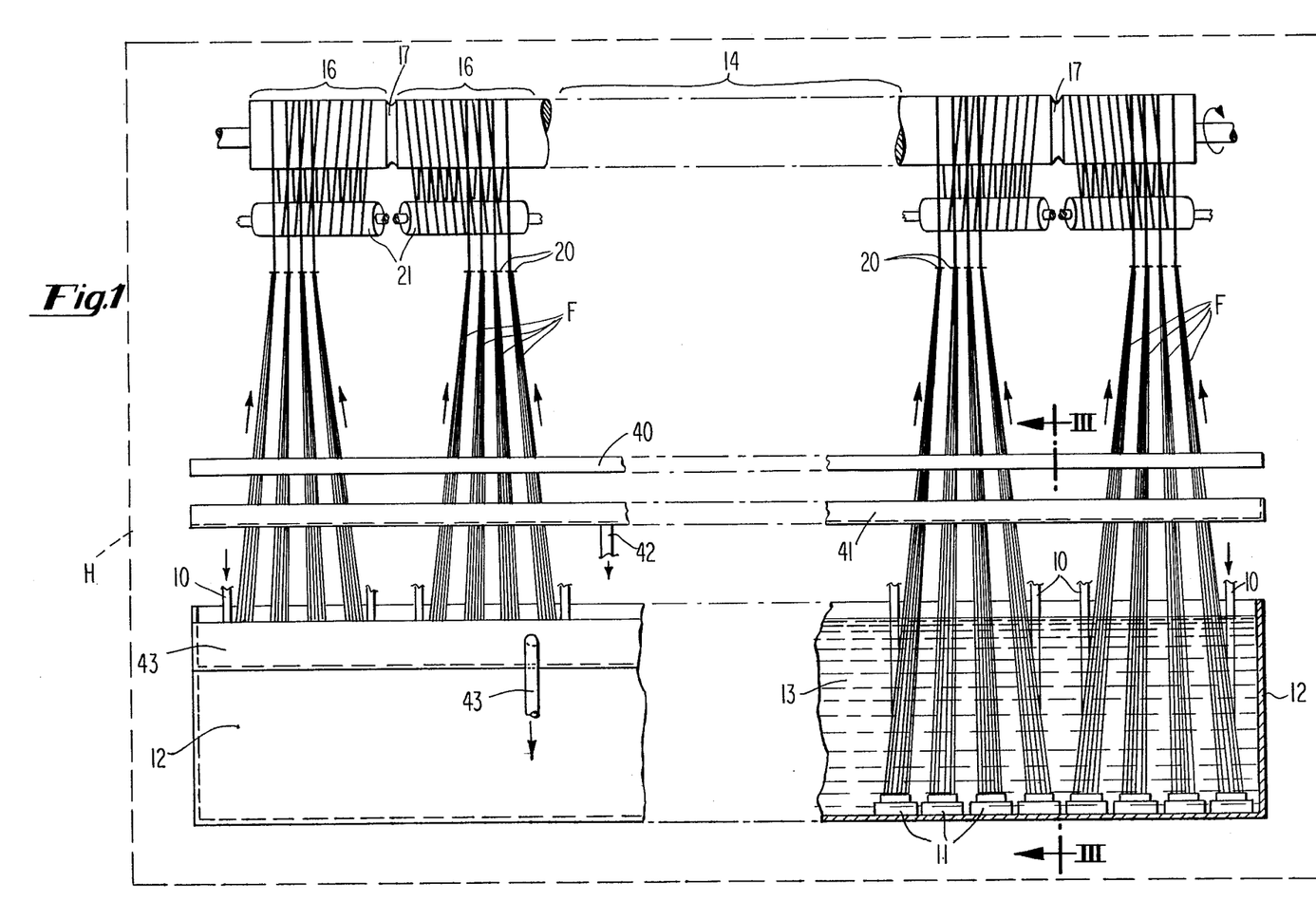
FIG. 1 is a view in side elevation of an in-line viscose rayon spinning machine constituting one embodiment in accordance with this invention, with certain parts broken away and others shown in section, in order more clearly to reveal important details.

Turning now to FIG. 1 of the drawings, the number 10 designates flexible tube feedlines for viscose solution which has been prepared in any of a variety of ways in accordance with the viscose rayon process. For example, the spinning liquid may be prepared by dissolving cellulose xanthate in aqueous caustic solution. In spite of the thorough mixing received by these materials in conventional practice, the xanthate solution usually contains small particles of undissolved material ranging in size from those easily visible to those of colloidal proportions. Accordingly, it is to be assumed that the cellulose xanthate solution has been filtered through successive stages of filter presses to remove such particulate material before spinning. Thus, the xanthate solution supplied through the pipes 10 is essentially completely free of any undissolved soluble material, and of insoluble particles, and has almost always been subjected to repeated filtration. Further, it is of course chemically composed of such ingredients that, when contacted with an acid bath in accordance with the usual viscose rayon practice, the viscose rayon fiber is precipitated promptly upon contact with the acid bath to form a plurality of fibers upon emerging through the multiple holes in the spinneret.

In FIG. 1 the number 11 designates a multiplicity of spinnerets arranged in groups within a spinning tank 12. As shown in FIG. 1 the spinnerets are arranged in groups of four, in line with each other, near the bottom of the tank 12 which contains acid 13 in aqueous solution. It will also be apparent in FIG. 1 that the groups of filaments F are conducted upwardly through the bath from the spinnerets 11 and are taken out of the bath in the space above the bath by a take-up means which will now be described in particular detail. The filament bundles from separated jets may, if desired, be combined into one tow at the guides 20, by using a single such guide.

Still referring to FIG. 1, an upper drum 14 is provided, which extends substantially horizontally and substantially in line above the line of the spinnerets 11. The upper drum 14 is continuously driven in rotation on its axis 15 and is a continuous shaft having a plurality of indentations 17 forming a plurality of sections 16. Each section 16 is located directly above and in line with each group of four spinnerets 11, as shown in FIG. 1, in a manner to collect the groups of filaments F which are produced by each of the spinnerets 11, these filaments being conducted to the upper roll 14 through guides 20.

Located beneath the sections 16 of the upper drum 14 are a plurality of separate individual lower drums 21. Each of these lower drums 21 is separate from the other and they are preferably free wheeling, but may be driven if desired. They are arranged in a horizontal plane, parallel in the horizontal sense to the upper drum 14. However, each lower drum 21 is canted by swinging it through a small angle of rotation about an imaginary point P at one end of the lower drum 21, through a very small angle. They are, as shown, alternately canted left and right. This canted arrangement assures that the individual groups of filaments F, which are conducted through the guides 20 and over the upper drum 14, and under the lower drum 21 and so on in repetition, remain equally tensioned and equally spaced from each other as they make a multiplicity of passes around these upper and lower drums. It has been found that this is a highly effective and efficient manner of collecting the filaments that are produced by the spinnerets 11 in the tank 12.

In the foregoing manner, groups of four sets of filaments F are collected in a common section of the spinning machine, and similar groups of four sets of filaments F are collected in other adjacent sections, all along the length of the bath and all along the length of the upper drum 14. This contributes to the production of a more uniform product than would otherwise be produced.

One particularly desirable form of linear machine consists of thirty-two spin positions, with the spinnerets subdivided into eight groups of four each. Uniformity of collected tow along the machine, a specific advantage also associated with the spinning machine, is attained by collecting the strands from each of the four jet subgroups on a separate advancing drum and later combining these strands into tow. It is also highly advantageous that the advancing drum system which draws the filaments from the spinnerets consists of one single drum extending the length of the machine with a step or indentation between each four-jet subgroup. Dropped ends and wastage are worked into such indentations for easy removal from the machine. Mating with this single drum and adapted to advance the groups of filaments in each of the four subgroups are eight advancing rolls, each canted slightly with respect to the single advancing drum extending the length of the machine. From these advancing drums, the four tows of each subgroup, combined, are passed, in a manner further to be described in detail, through a subsequent closed, sealed stretch bath to draw rolls and thence to stretching, washing and cutting operations.

Another advantage associated with the specific arrangement of the upper and lower drums 14 and 21, and the spinnerets 11, is that quality and spinability of the product are improved by eliminating non-uniform bath drag on the filaments and non-uniform travel time between spinning positions, from jet to stretching.

Figure 2:
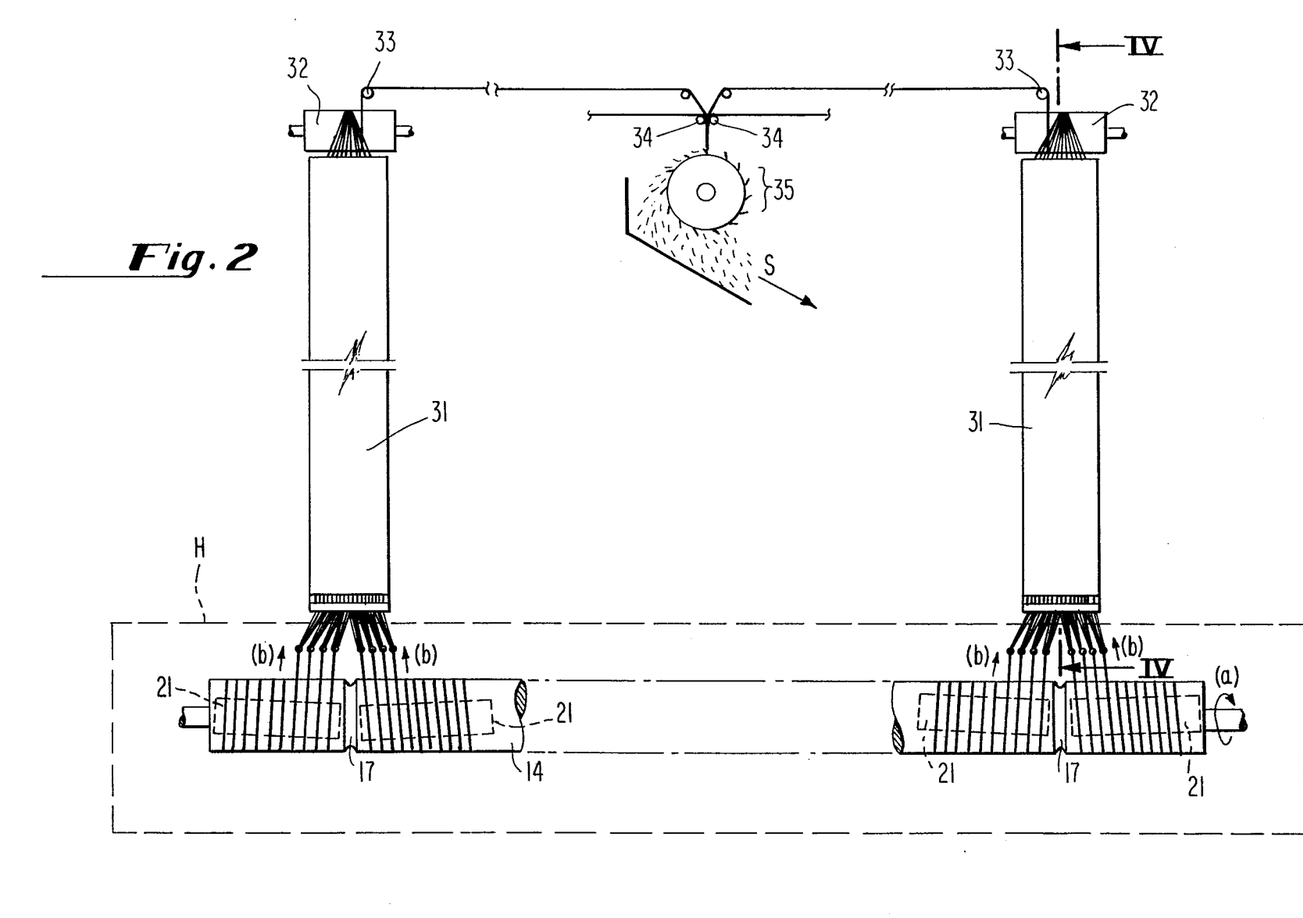
FIG. 2 is a top plan view of a viscose rayon spinning machine of the type illustrated in FIG. 1, showing associated stretch baths and further equipment and process steps involved in the further processing of the viscose rayon strands produced in such machine.

FIG. 2 shows a top plan view, looking down upon the upper drum 14, showing that the stretch baths 31, 31 are immediately adjacent to the housing H for the spinning machine in a manner to eliminate substantially completely any significant escape of gas, and showing in somewhat exaggerated form the alternate angle of cant of the lower individual drums 21. As viewed in FIG. 2, the upper drum is rotating in the direction indicated by the arrow (a) and the filaments are moving in the direction indicated by the arrows (b) into a plurality of parallel stretch baths 31. As shown, two adjacent sets of filaments are combined and fed into a common stretch bath 31. In the stretch baths they are subjected to a hot regenerating bath and to tension, as will be further described in detail hereinafter, and are drawn by multiple draw rolls 32 and passed around a further guide 33, whereupon two or more (preferably four) such groups are combined with each other after passing over guides 34, 34 and are cut into staple by a cutter schematically indicated in the drawing and designated by the number 35. The cut staple S thus produced is conveyed in the usual manner for further processing such as washing, etc.

Figures 3, 4, 5, 6, 7:
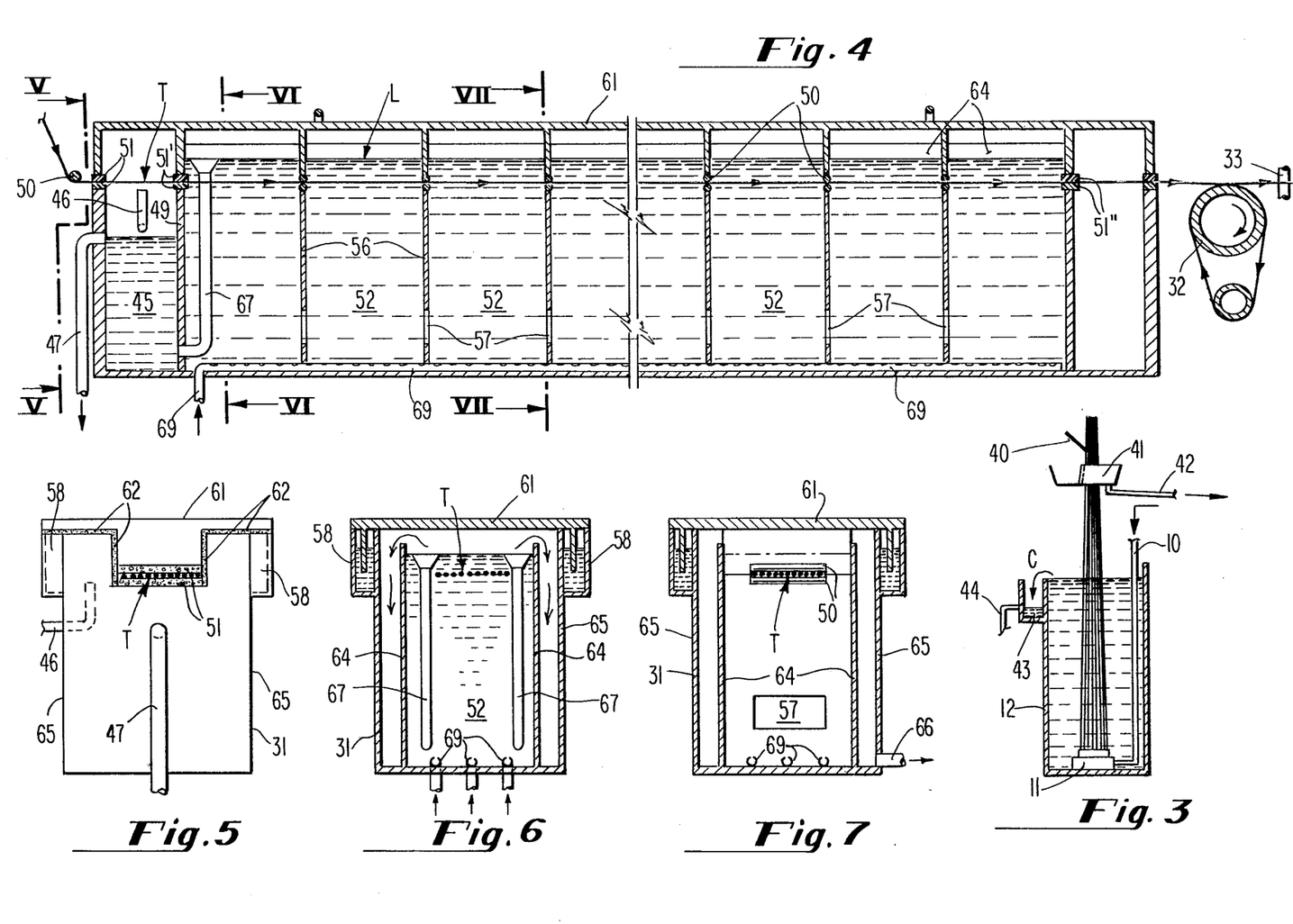
FIG. 3 is a sectional view taken as indicated by the lines and arrows III—III which appear in FIG. 1.
FIG. 4 is a longitudinal sectional view taken through a stretch bath of the type illustrated in FIG. 2, taken as indicated by the lines and arrows IV—IV which appear in FIG. 2.
FIG. 5 is a sectional view taken through the stretch bath along the lines and arrows V—V which appear in FIG. 4.
FIGS. 6 and 7 are additional cross-sections from FIG. 4 along the lines and arrows VI—VI and VII—VII respectively.

FIG. 3 shows, in section, the general arrangement of the spinnerets 11 in the tank 12, and shown a flexible tube 10 through which the viscose solution is pumped to the spinneret. The number 40 designates a stripping guide which contacts the fibers F as they emerge from the bath, and which strips off spent, reacted acid solution for collection in a pan 41 for draw-off to reclaim through the pipe 42. This stripping guide is used to engage the freshly spun strands above the bath level but prior to its collection into a tow, and serves to remove spent spinning bath adhering to the freshly spun strands. This spent spinning bath is collected for reclamation separately from the treatment spin bath which is recirculated from a normal overflow weir in the spin bath trough. A significantly higher sodium sulfate and lower sulfuric acid concentration is present in this adhering spin bath than in the normal bath overflow which, as indicated by the arrow (C), flows into trough 43 for recirculation via pipe 44. Separate treatment of this relatively small quantity of spent bath collected from pipe 42 significantly facilitates and reduces the cost of chemical reclamation.

It will be understood, of course, that the entire spinning apparatus illustrated in FIG. 1, including the drums 14, 21 and all exposed fibers, is highly preferably isolated completely from the atmosphere by housing it in a closed housing H (shown in dash lines in FIGS. 1 and 2) to which an exhaust blower system may be connected for collecting and recovering $CS_2$, $H_2S$ and other components of the gas which are liberated.

Further details with respect to the stretch bath 31 appear in FIGS. 4–7. In FIG. 4, the collected groups of tow composed of the fibers F are introduced to the stretch bath in a flattened-out form by passing them across rod 50 which may or may not be curved. The flattened tow sheet T is introduced through a slotted opening near the top of the stretch bath 31, and is passed between sponge pads 51, 51 which serve as seals against escape of evolving gases. A draining, venting and overflow compartment 45, defined by the divider 49, is located at the inlet end of the stretch bath 31 and is provided with a vent 46 (FIGS. 4 and 5) for $CS_2$ and $H_2S$ which are subsequently scrubbed and recovered, and an overflow pipe 47 for the countercurrent bath flow and for liquid drained or stripped out of the tow T by the stripper rods 50,50. The tow T proceeds beyond the first divider 49 through further sponge pads 51', 51' into the bath within the stretch bath, running slightly below the level L of the bath 52 in the stretch bath 31. The tow T is guided by passage beneath successive rods or bars 50 and passes out of the opposite end of the stretch bath 31 through further sealing pads or sponges 51'',51''. The tow T is subjected to tension by the action of tow rolls 32 which are driven in rotation in the manner indicated by the arrow in FIG. 4 to apply stretch to the tow. The emerging tow T then passes through a guide 33 for further processing.

It will be observed in FIG. 4 that the stretch bath 31 is divided into a multiplicity of compartments by vertically extending partitions 56, 56, a multiplicity of which are provided, and which are spaced apart from each other at a desired interval. Each one of these dividers 56 is provided with a slotted opening 57 near the bottom thereof, affording limited passage of the liquid from section to section, thus reducing turbulence and controlling the flow of liquid so as to maintain a current counter to the direction of tow travel.

As appears more particularly in FIGS. 5–7, the stretch bath 31 has a cover 61 which is sealed at its ends by gaskets 62 (one at each end) to the end walls of the stretch bath 31. Cover 61 rests on top of the side walls 65, 65 and is freely removable. Troughs 58 are sealed to the stretch bath and contain liquid; the cover 61 has depending strips 59 which extend into the liquid to form a seal when the cover 61 is lowered into position. In the interior of the stretch bath, a set of innermost side walls 64, 64 (FIGS. 6 and 7) is provided for containing the bath 52, and another set of spaced apart side walls 65, 65 is provided in order to form a chamber for release and collection of gases which are liberated from the tow and collected above the bath portion 52. This gas flow is indicated by the arrows in FIG. 6 and the gases pass out through the pipe 66 (FIG. 7) for collection and recovery. It is to be noted that these vapors are concentrated with respect to $CS_2$, and can be recovered by simple condensation in a system different and separate from that in which the dilute gases from the spinning machine and chamber 45 of the secondary bath are recovered. However, when the lid is lifted the gases being drawn off through line 66 are automatically diverted to the dilute gas recovery system by means of an interlock to be described hereinafter.

The number 69 designates one or more steam sparging lines (other means of heating can be used) having a plurality of steam openings directed upwardly to introduce steam jets at spaced locations within the stretch bath. The number 67 designates a liquid overflow line which is open upwardly at the liquid level in the stretch bath, which line 67 empties into the compartment 45, which in turn empties by way of pipe 47. This arrangement, in conjunction with the closed spinning system, constitutes a practically sealed system, whereby substantially all $CS_2$ used in the process is regenerated as $CS_2$ or $H_2S$ and is thereby contained, collected and removed for recovery. Also the spin bath chemicals remaining in the tow are likewise substantially leached out and recovered.

Accordingly, the in-line spinning machine illustrated in FIGS. 1 to 7 of the drawings as heretofore described constitutes a highly efficient and effective machine for the production of viscose rayon staple, affording efficiency and economy of operation, minimum capital expenditure per ton of viscose product capacity, and in which substantially complete control is had with respect to ecologically unacceptable products such as $H_2S$, $CS_2$, and spin bath constituents such as $H_2SO_4$, $ZnSO_4$ and $Na_2SO_4$.

Figure 8:
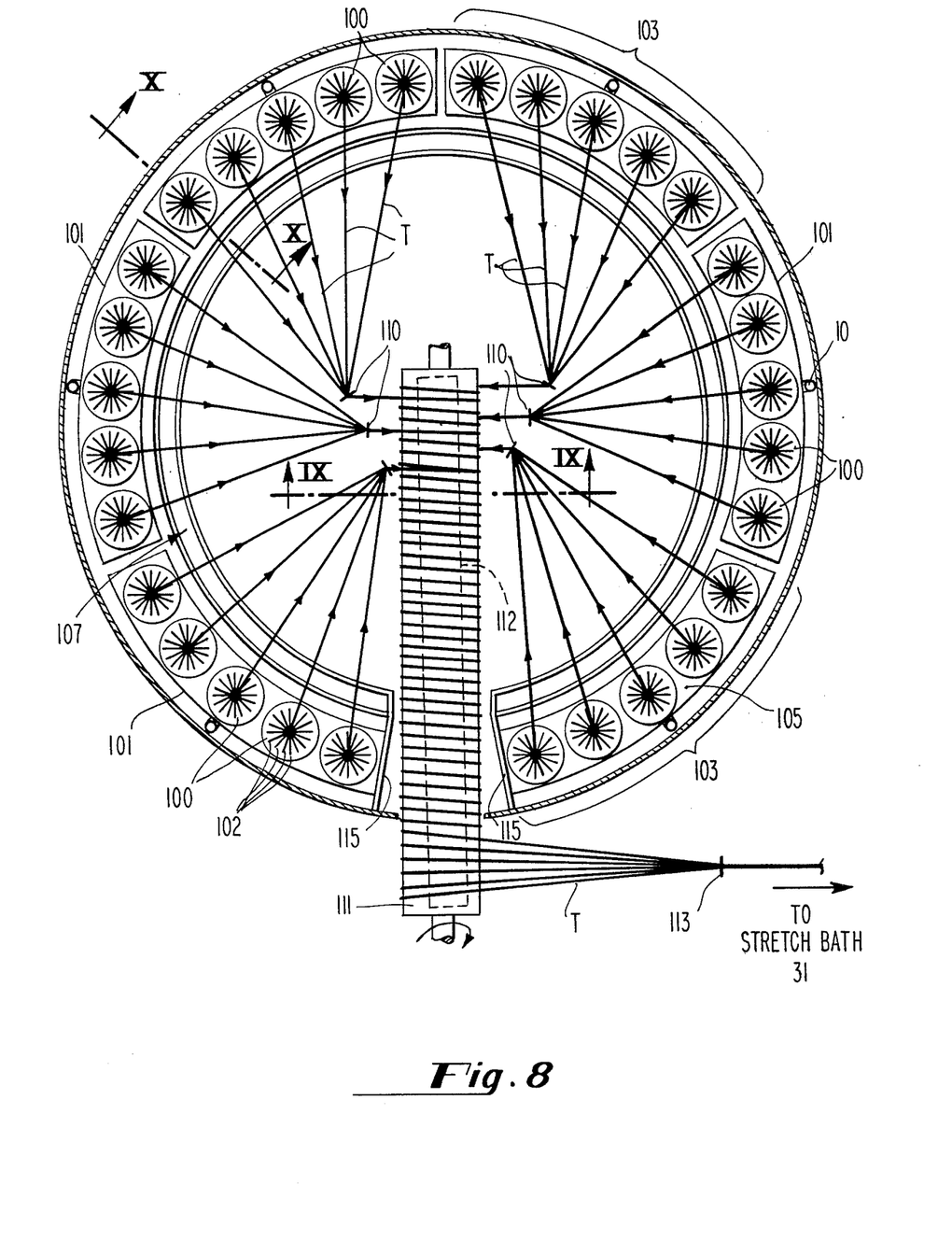
FIG. 8 is a top plan view of a particular form of a circular spinning machine comprising a further embodiment in accordance with this invention.
Figure 9:
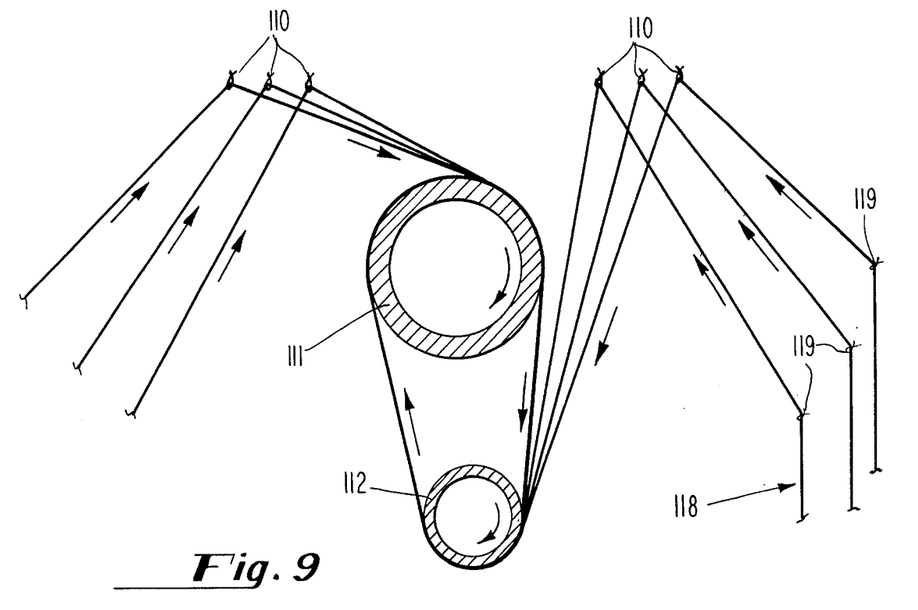
FIG. 9 is a view taken sectionally through the upper and lower drums which are associated with and comprise a component of the circular machine of FIG. 8.
Figure 10:
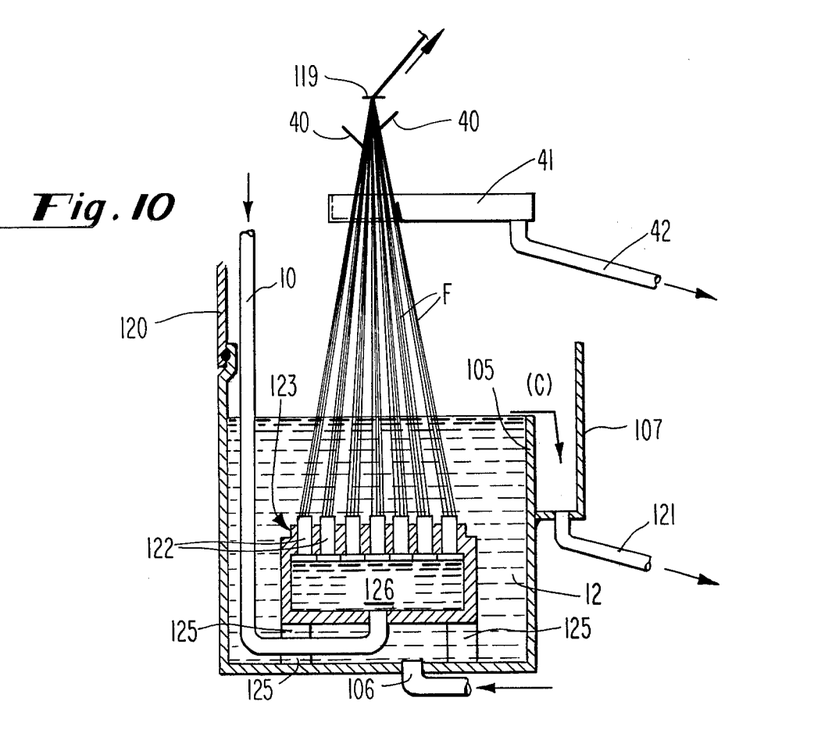
FIG. 10 is a considerably enlarged sectional view taken through one of the spinning positions in the circular spinning machine of FIG. 8, taken as indicated by the lines and arrows X—X which appear in FIG. 8.

Turning now to FIGS. 8 to 10 of the drawings, another embodiment of the invention comprising a circular spinning machine is shown. Referring to FIG. 8 which is a top plan view of a circular spinning machine, the machine is annularly shaped and includes a plurality of spinning jets 100 arranged annularly in the arc-shaped jet blocks 101. These spinning jets are only shown schematically with respect to the thread paths in this Figure; various orifice arrangements are available. Each spinning machine comprises a multiplicity of jets 100 each having a plurality of tiny holes 102 through which the xanthated viscose solution is extruded. As will be seen in FIG. 8, the jets 100 are arranged in groups 103, here shown as five in a group; viscose is supplied to the group through the common block manifold 101. The groups 103 are arranged circularly, as shown. Various guides and a pair of thread advancing drums 111 and 112 supply means for vertically drawing the resulting fibers upwarding from the spinning bath 105. As shown in FIG. 10, each trough section 105 is fed with spin bath solution through a feed pipe 106, and has an overflow trough 107 for the recovery of overflow solution. As shown in FIG. 8, each block 101 is separated from its neighboring groups, and each set of spinning jets 100 (five per group) can be removed as a unit for inspection, servicing or repair. Alternately each jet sub cluster 100 can be supplied with viscose independently and be serviced independently of the other jets in the major cluster 103. The trough 107 is provided for catching excess acid and for returning it to reclamation. As shown in FIGS. 8 and 10, vertical spinning away from the jet face is achieved by passing the strands from each jet over a circular bar guide or set of guides situated several inches, approximately one foot, above the spinning bath. Also as shown in FIG. 8, guide devices which may be pig tails or porcelain eye guides or the like 110 are provided for gathering all of the filaments produced from all of the jets 100, into a common tow representing the product of the five jets of the group. These guide eyes or hooks are located at the center of the apparatus, and conduct the individual tows upwardly to a pair of double drums, the upper drum being designated by the number 111 and the lower drum, which is canted with respect to the upper drum 111, being designated by the number 112. As has been heretofore described in connection with the in-line machine of FIGS. 1 to 7 the lowermost drum 112 is canted by arranging it at a slight angle in a horizontal plane, with respect to a point adjacent one end of the lower roll 112. As is shown in FIG. 8, the six individual tow sections T are fed separately, each around the upper drum 111 and then down around the lower canted drum 112, and repeatedly up and down around the two. The canted relationship between the upper and lower drums assures the uniform and accurate spacing of all six of the tow groups T, as they pass lengthwise along the axis of the upper drum 111. At the exit end of the upper drum 111, the six groups of tow T are taken off and passed through a collecting guide 113 and are formed into a sheet which is moved continuously to the stretch bath as previously described in FIGS. 4-7.

It will be observed in FIG. 8 that although the groups of jets are circularly arranged, the circle is not quite complete and that end walls 115 are provided, forming an intervening space for the upper and lower drums 111, 112, thus providing a highly effective and efficient manner for taking off the tows from the spinning jets inwardly toward the center of the circular machine, and then radially outwardly beyond its periphery. Further, the provision of relatively canted upper and lower rolls as indicated (either one or both may be canted), provides for the uniform and gentle handling of the freshly spun filaments of the tows T, resulting in a highly uniform and desirable product.

FIG. 9 shows the manner in which the individual tows T are directed substantially vertically upwardly from the spinning baths as indicated by the number 118 by means of a circular bar guide 119 (or series of guides) situated above the spinning bath, are collected through the guides 110, and how they are passed alternately over the upper tow advancing roll 111 and under the lower tow advancing roll 112.

Turning now to FIG. 10 of the drawings, further details of the spinning bath of the circular machines illustrated in FIG. 8 are shown. It will be seen that the wall 107 provides an overflow for the excess acid from the spinning bath, and that a cover 120 is provided for confining the vapor (gas) within the machine. Return pipes 121 are provided for returning the excess acid bath for recirculation and reclamation.

A particular form of spinning jet, which is highly desirable, is shown in FIG. 10. In order to maximize the number of holes per spinning jet, and to increase substantially the accessability of the spinning bath to freshly spun filaments, a spinning jet has been created comprising a large spinneret with several (on the order of thirty-five, for example) cylindrical projections 122 or clusters extending above the face 123 of the spinneret. Thus, each cylindrical projection 122 contains a multiplicity of holes at the upper face thereof, for spinning a multiplicity of filaments of viscose rayon. Each cylindrical projection 122 is press fitted within the block 124 and may be removed for inspection, maintenance or repair. It will be appreciated that the entire jet is supported on supports 125, 125 and has a chamber 126 for the xanthated viscose solution, which is pumped into the chamber and flows uniformly upwardly through all of the individual cylindrical projections 122 in a manner to form uniform filaments F within the acid bath.

In this manner, the number of filaments of product per spinning jet is maximized, and the separation of the total number of holes into groups or islands raised from the base of the spinning jet permits the acid spinning bath to flow inwardly toward the center of the spinneret face and upwardly around the various cylindrical projections 122 and around the various groups of freshly spun filaments for intimate and immediate contact with the xanthated viscose streams as they emerge from the holes of the spinnerets.

As heretofore discussed with respect to the linear machine (FIG. 3), it is highly advantageous to strip the spent acid as shown by arrangement 40, 41 and 42 in FIG. 10.

Figure 11:
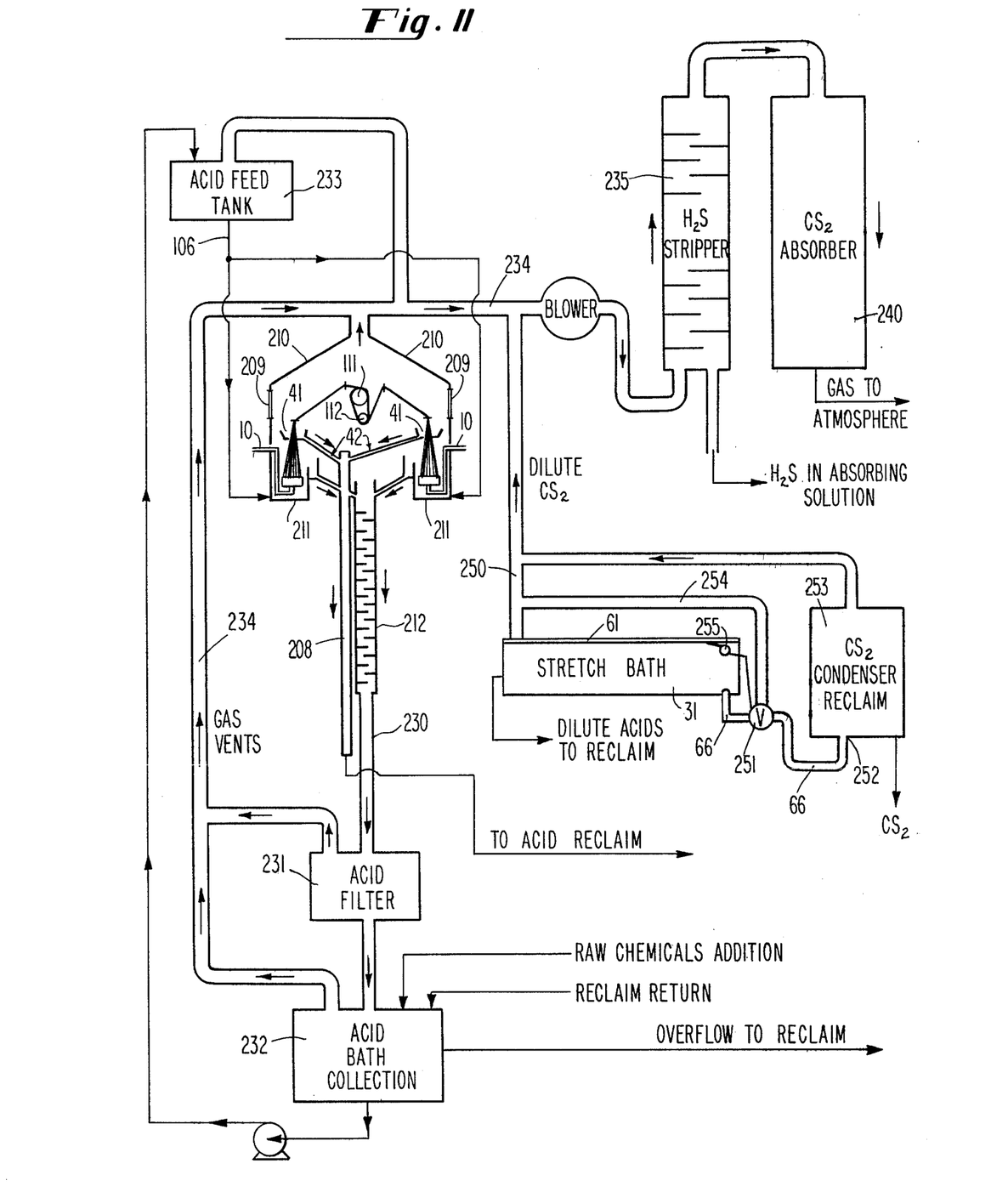
FIG. 11 is a schematic view showing an overall production plant for spinning viscose rayon in accordance with this invention.

FIG. 11 shows schematically a overall plant arrangement illustrating an important and advantageous feature of this invention. Although a preferred plant layout comprises several complete interconnected units, only one such unit has been shown in FIG. 11 for the sake of simplicity and to avoid repetition in the drawing. The overall scheme of FIG. 11 applies either to the circular machine as shown or to the linear machine.

One of the great advantages of the arrangement shown in FIG. 11 is the substantially complete recovery of acid bath constituents, hydrogen sulfide and carbon disulfide. Each spinning bath 211 is completely hooded by a hood 210 for entrapment of released gases, and provided with glass panels or doors 209 for observation or access of operating personnel. Further, overflow columns 212 shown in FIG. 11 provide baffle plates for causing a downward cascading flow of the acid overflow from the spinning baths, while permitting countercurrent upward flow of air and $H_2S$ liberated from the bath, which together with any $CS_2$ that is also liberated is drawn into the scrubbing and recovery system for dilute gases. The acid collected in lines 230 is passed through filter tanks 231 where it is filtered through anthracite coal or quartz sand, for example, and collected in a collecting tank 232. Clear, filtered acid is then pumped to feed tank 233 which is equipped with a feed line 106, leading to the spinning bath 211.

The acid bath from the stripping pans 41 (FIG. 10) is collected in line 208 and fed to an acid reclaim operation for removal of $H_2O$ and $Na_2SO_4$.

Simultaneously, the hydrogen sulfide and carbon disulfide which are released as a part of the spinning operation are caught under hood 210 and flow upwardly through duct 234 through a scrubber column 235, where this gas is treated by the cascading downward flow of scrubbing solution to remove all $H_2S$ from the gaseous mixture. The scrubbing solution may be, for example, NaOH or $Na_2CO_3$; however other scrubbing solutions are equally effective. The remaining carbon disulfide-air mixture is passed to the absorber 240 which is filled with activated carbon for reclaiming and reusing the carbon disulfide.

The stretch bath 31 is connected by a vent line 250 into the vent line 234 and joins the dilute $CS_2$—$H_2S$ recovery system. By line 66 the concentrated $CS_2$ is conducted through a three-way valve 251 to the inlet 252 of a $CS_2$ condenser reclaim system 253. The valve 251 is also connected by a line 254 to the dilute gas vent line 250. The three-way valve 251 is automatically actuated by the removal of the cover 61 of stretch bath 31 so that, when cover 61 is not covering stretch bath 31 the connection to line 66 is closed and all gas flows to line 254. When cover 61 closes stretch bath 31, valve 251 closes the connection to line 254 and opens the connection to condenser 253.

The foregoing system arrangements, in combination with the other basic design element of either the linear or circular machine, are important and advantageous. The complete hooding and recapture of all volatiles including hydrogen sulfide and carbon disulfide, is important and is greatly facilitated by the annular arrangement of the spinning machine, provided with a centrally located acid overflow scrubber column 12. However, it will be appreciated that the same arrangement is used in conjunction with the in-line machine of FIGS. 1 to 5 of the drawings. Although not shown because of the schematic arrangement of FIG. 11, the tow outlet from the spinning machine is very close to the inlet to the stretch bath in order to eliminate or minimize losses of $CS_2$ or $H_2S$ to the atmosphere. Further, the gap between the two may be hooded for retention and collection of gases.

It is an advantage to provide for the immediate degassing of the spinning bath as shown in FIG. 11, prior to recycling and reclamation of the solution. Prevention of jet incrustation, prevention of build-up of spinning line deposits, prevention of reduced heat exchange and reduced fouling of bath filters are all benefits of this step, in addition to reduced ventilation requirements.

Because in accordance with this invention the spinning is conducted in a vertical fashion, the volumes of acid required for the overall closed circuitry are much smaller than in the case of horizontal spinning. With the thus reduced volumes (only five to ten times the amount of acid required to neutralize the sodium hydroxide in the spinning operation), it is practical for the first time to utilize with full efficiency the recovery systems shown in FIG. 11 of the drawings. In present day spinning operations it is quite usual to employ from twenty to fifty times the amount of acid required to neutralize the caustic soda.

It should be understood that although certain advantages are inherent in either the in-line or circular machines described and shown in the drawings herein, either may be used independently of the other, and in combination with the overall arrangement appearing in FIG. 11 of the drawings.

The provision of large multi-component jets, which may contain a grouping of fifteen hundred hole jets into a first order cluster, and which may or may not include first order clusters then grouped into larger or second order clusters, is highly advantageous in providing high production and excellent uniformity, particularly when arranged in groups as disclosed herein. Such groups may of course, either be in-line groups or arcuately arranged groups of a circular or partially circular machine.

It is highly desirable to use a flexible rather than a rigid connection between the viscose pump and the jet, in order to save space, and to gain operating flexibility to lace or to flush the jets, and has particular advantage in connection with the production of staple.

It is further important to observe that although the use of vertical spinning has been applied in tire cord technology, it has never to the best of our knowledge been applied to staple and has never been utilized in a manner to obtain the jet concentration that is obtained in accordance with this invention, or to use less bath area for gas evolution, or to reduce the bath flow as is achieved in accordance with this invention. Further, the construction in accordance with this invention provides ease of enclosure of the bath, and reduced bath flow facilitates bath filtration and chemical and gas recovery.

As stated heretofore, an important and advantageous feature of this invention resides in the separation of stripped or neutralized spin bath from the bulk of the bath, and thus provides more efficient recovery of sulfuric acid, zinc sulfate and sodium sulfate.

Although it is not a necessary limitation in accordance with this invention, it is highly desirable in the machine of this invention to provide an ultrasonic in-line jet cleaner for each jet, which leads to extremely long jet life and provides a minimum of interruptions in the spinning process. This minimizes worker exposure to gases and allows the entire plant operation to enjoy a reduction of fresh air flow to the spinning machine. This in turn further facilitates gas recovery.

It is extremely important and advantageous that the stretch bath heretofore described be covered and sealed along its extended length. This permits easy and complete recovery of carbon disulfide, and almost completely eliminates release of gas along the cutter and washing section of the machine. These factors coupled with improved recovery produce reduced hazards and sharply reduce the requirement for enormous amounts of fresh air which were previously required in prior art viscose rayon processes. The designs in accordance with this invention further improve product uniformity and spinability.

Although this invention has been described in connection with particular arrangements, including an in-line machine and a circular spinning machine, it will be appreciated that many variations may be utilized by those skilled in the art without departing from the spirit and scope of this invention. For example, parts may be reversed, components of the process may be interchanged, and certain features may be used independently of the use of others, all within the spirit and scope of this invention as defined in the appended claims.

The following is claimed:

1. Apparatus for spinning viscose rayon, comprising means forming an acid bath having enclosure means arranged for trapping and collecting any gases emanating from said bath, means for feeding an acid solution to said bath, a plurality of fiber-forming jet means disposed substantially along beneath the surface of said acid bath, means for forcing aqueous xanthated alkali cellulose in liquid form into said jet means and through said jet means into said bath, means for maintaining a low gas level in said acid bath, take-up means located within said enclosure means above said acid bath for taking up the resulting fibers in an upward direction within said enclosure means, means for delivering freshly spun fiber to a stretch bath, said stretch bath having means for reducing turbulence and controlling the flow of liquid relative to the direction of fiber travel, and take-up means associated with said stretch bath for removing the fiber from said apparatus.

2. The apparatus defined in claim 1, wherein said jet means are divided into a plurality of jet groups each comprising a plurality of jets.

3. The apparatus defined in claim 2, wherein means are provided for removing each said jet group from said bath, independently of the other jet groups.

4. The apparatus defined in claim 1, wherein said jets are arranged facing upwardly, wherein means are provided for forcing said xanthated liquid upwardly through the orifices in said jets, and wherein said take-up means is arranged to move said resulting fibers substantially vertically upwardly from said jets.

5. The apparatus defined in claim 4, wherein said take-up means comprises a pair of spaced apart drums around which the resulting fibers are spirally alternately wound.

6. The apparatus defined in claim 1, wherein means are provided for collecting substantially all of the fibers produced by all of said jets in said apparatus and combining them into a common tow, and wherein said tow is continuously taken up by said take-up means.

7. The apparatus defined in claim 6, wherein guide means are provided for causing said fibers to move in a path substantially vertically above the jet means from which they were produced, and wherein further guide means are provided for converging said fibers into a common tow.

8. The apparatus defined in claim 1, including an overflow collecting vessel disposed adjacent said bath.

9. The apparatus according to claim 1 including means in said apparatus forming a substantially annular acid bath, said bath having overflow means for establishing a fluid level therein, means for feeding an acid solution to said bath, a plurality of jet means for extruing fiber-forming material arranged substantially annularly therein, means forming a spinning bath overflow treating column associated with said overflow means and at least partially surrounded by said bath.

10. The apparatus defined in claim 1, wherein said bath is broken and wherein said take-up means is located in or adjacent said broken portion.

11. The apparatus defined in claim 1, wherein vent means are provided on both said spinning machine and said stretch bath and connected to recovery means for the vented gases.

12. The apparatus defined in claim 11, wherein said vented gases included $CS_2$ and $H_2S$, and wherein absorbtion recovery means are provided for recovering said $CS_2$.

13. The apparatus defined in claim 12, wherein a scrubber is provided, in advance of said absorbtion recovery means, for recovering $H_2S$ from said vented gases.

14. The apparatus of claim 1, wherein said acid bath has an elongated configuration.

15. The combination defined in claim 14, wherein said take-up means comprises a pair of take-up drums.

16. The combination defined in claim 15, wherein one of said take-up drums is canted with respect to the other.

17. The combination defined in claim 15, wherein one of said take-up drums is provided with a plurality of spaced apart indentations thus forming a plurality of intervening drum sections.

18. The combination defined in claim 17, wherein said indentations are substantially equally spaced.

19. The combination defined in claim 15, wherein one said drum is above the other.

20. The combination defined in claim 19, wherein indentations are formed in the upper drum.

21. The combination defined in claim 19, wherein a plurality of lower drums are provided in canted arrangement beneath said upper drum.

22. In an apparatus for spinning viscose rayon, the combination which comprises means forming a plurality of acid baths each containing a plurality of fiber-forming jet means therein, each bath having overflow means for establishing a fluid level therein, means communicating with said jet means for introducing xanthated alkali cellulose liquid to and through said jet means to form a multiplicity of streams flowing into said baths, means disposed within said apparatus for delivering an acid solution to each of said baths, means disposed within said apparatus for moving said filaments upwardly out of said baths, means for combining said filaments to form a plurality of tows each of which corresponds to one of said baths, means forming a spinning bath overflow collecting column connected to receive fluid from each of said baths, means for separating gas from said spinning bath overflow in said column, gas collecting means substantially sealingly connected to each of said baths, means for delivering said tows to a stretch bath, said stretch bath having means for reducing turbulence and controlling the flow of liquid so as to maintain a current counter to the direction of tow travel, common means sealingly connected to said individual gas collecting means for collecting and recovering substantially all of said gas, and means in said apparatus for collecting used acid from a plurality of said baths whereby gas is removed from the spent acid so that acid which is reused contains a reduced amount of gas.

23. The apparatus defined in claim 22, wherein said gas collecting means also comprises an absorber having the capability of absorbing carbon disulfide.

24. The apparatus defined in claim 22, wherein said acid collecting means includes a filter means connected to receive the acid underflow from said collecting column, and a collecting tank for collecting the filtered acid.

25. In an apparatus for spinning viscose rayon having a spinning bath and a stretch bath, the improvement which comprises, spinning bath enclosure means arranged for trapping and collecting gases emanating from said spinning bath, stretch bath enclosure means arranged for trapping and collecting gases emanating from said stretch bath, condensed gas removal means connected to said stretch bath enclosure for removing condensed gases from said stretch bath, and further gas removal condensed gases from said stretch bath, and further gas removal means associated with both said spinning bath enclosure means and said stretch bath enclosure means for removing gases therefrom, and collecting means for collecting the gases thus removed.

26. The apparatus according to claim 25 wherein said further gas removal means includes a gas scrubber.

27. The apparatus according to claim 26, including an absorption means for recovering hydrogen sulfide gas.

28. The apparatus according to claim 25 wherein said further gas removal means includes an absorber having the capability of absorbing carbon disulfide.

29. The apparatus according to claim 25 wherein said stretch bath enclosure means includes a sealed removable cover.

30. The apparatus according to claim 29 wherein means is operatively associated with said stretch bath for diverting gas from said condensed gas removal means to said further gas removal means in response to removal of said cover.

31. The apparatus according to claim 25 wherein means are provided for recovering said gases.

32. The apparatus according to claim 25 including means for degassing spent liquid from said spinning bath.

33. In an apparatus for spinning viscose rayon including means forming an acid bath, means for feeding an acid solution to said acid bath, fiber forming jet means disposed beneath the surface of said bath, means for forcing aqueous xanthated alkali cellulose in liquid form into said jet means to produce a multiplicity of fibers, means for taking up the resulting fibers and means for delivering freshly spun fibers to a stretch bath, the improvement which comprises: first enclosure means sealingly enclosing said acid bath and take-up means for trapping and collecting substantially all gases emanating therefrom, a second enclosure means arranged for trapping and collecting gases emanating from said stretch bath, first gas removing means disposed for removing condensed carbon disulfide gas from said second enclosure means, second gas removal means associated with said first and second enclosure means for removing substantially all dilute gases from said first and second enclosure means, and means for recovering said removed gases.

34. The apparatus according to claim 33 including means for degassing spent acid within said first enclosure means.

35. In an apparatus for spinning viscose rayon having means forming an acid bath, said bath having overflow means for establishing a fluid level therein and means for feeding an acid solution to said bath, the improvement which comprises means associated with said bath for conducting used acid from said bath, baffle plate means disposed in said apparatus and separate from said bath, for causing a downward cascading flow of used acid so as to remove gases therefrom.

36. In an apparatus for stretching viscose rayon filaments having at least one stretch bath and means for passing the filaments through the stretch bath, the improvement in which said stretch bath comprises a container having a first overflow means establishing a container fluid level therein, said container including at least two openings through which the filaments are caused to pass through said container below the established fluid level, said openings having sealing means for sealing against escape of container liquid, and means for preventing gases which emanate from said bath from escaping to the atmosphere.

37. The apparatus according to claim 36, including a removable cover means sealingly covering the top of said container to prevent the escape of evolving gases from said bath.

38. The apparatus according to claim 37, including means for preventing said gases from escaping to the atmosphere when the cover means is removed from said container.

39. The apparatus according to claim 36, including means for spreading said filaments prior to their introduction into said container.

40. The apparatus according to claim 36, wherein means are provided within the entrance to said container forming a gas vent chamber, said chamber having an inlet for said filaments, sealing means adjacent said inlet for sealing against escape of evolving gases, and including a second overflow means within said chamber communicating with said first overflow means, said second overflow means establishing a fluid level which is lower than said container fluid level.

41. In an apparatus for stretching viscose rayon filaments having at least one stretch bath and means for passing the filaments through the stretch bath, the improvement in which said stretch bath comprises a container having a first overflow means establishing a first container fluid level, said container including at least two openings through which the filaments are caused to pass through said container, said openings having sealing means for sealing against escape of gas evolving from said bath, means within the entrance of said bath forming a gas vent chamber, said gas vent chamber having an opening for passing the filaments through said first container fluid below the liquid level, said opening having sealing means for sealing against the escape of liquid, said gas vent chamber including a second overflow means establishing another fluid level which is lower than said first container fluid level, means connected for recovery of the gases emanating from said bath.

42. The apparatus according to claim 41, wherein said stretch bath is in the form of an elongated container arranged to receive said filaments, said container further being in the form of a chamber for the release and collection of gases liberated from said filaments, including means sealing said container against the escape of evolving gases, means for providing heat into said container, and means connected to said container for introducing, conducting and stretching said filaments continuously along said container in continuous contact with said stretch bath liquid.

43. The apparatus according to claim 41, including means for combining said filaments to form a tow, and means for delivering said tow to said stretch bath, said stretch bath having means for reducing turbulence and controlling the flow of liquid so as to maintain a current counter to the direction of tow travel and means connected for recovery of spinning bath components carried out of a spinning bath by said filaments.

44. The apparatus according to claim 41, including means for reducing turbulence and controlling the flow of liquid in said bath.

45. The apparatus according to claim 44, in which said means for reducing turbulence and controlling the flow of liquid comprises a multiplicity of compartments.

46. The apparatus according to claim 45, wherein said compartments are provided with a slotted opening near the lower portion thereof so as to cause passage of liquid, and including stripping means for stripping excess fluid from the filament as it passes between compartments.

47. In an apparatus for spinning viscose rayon fiber having a spinning bath, jet means for extruding fiber forming material in said spinning bath, and take-up means for taking up the resultant fibers, the improvement which comprises at least one means prior to take-up for removing and collecting spinning bath liquid from said fibers containing spent spinning bath liquid and by-products and means associated with said removing and collecting means for separately recovering the thus-separated liquid.

48. In an apparatus for spinning viscose rayon fiber having a spinning bath, jet means for extruding fiber forming material in said spinning bath, and take-up means for taking up the resultant fibers, the improvement which comprises the combination of at least one means contacting said fibers prior to take-up for removing and collecting spinning bath liquid from said fibers containing spent spinning bath liquid and chemical by-products, means associated with said removing and collecting means for separately removing and recovering said collected liquid and means for recovering said chemical by-products from the liquid independently of other reclamation system and recycling said liquid after removal of said chemical by-products.

* * * * *